(12) United States Patent
Domey et al.

(10) Patent No.: US 10,926,290 B2
(45) Date of Patent: Feb. 23, 2021

(54) METHODS FOR PRINTING ON GLASS

(71) Applicant: CORNING INCORPORATED, Corning, NY (US)

(72) Inventors: Jeffrey John Domey, Elmira, NY (US); Matthew Wade Fenton, Elmira, NY (US); Govindarajan Natarajan, Poughkeepsie, NY (US); Paul John Shustack, Elmira, NY (US); Jian-Zhi Jay Zhang, Ithaca, NY (US)

(73) Assignee: CORNING INCORPORATED, Corning, NY (US)

( * ) Notice: Subject to any disclaimer, the term of this patent is extended or adjusted under 35 U.S.C. 154(b) by 125 days.

(21) Appl. No.: 16/230,165

(22) Filed: Dec. 21, 2018

(65) Prior Publication Data

US 2019/0126316 A1    May 2, 2019

Related U.S. Application Data

(62) Division of application No. 15/659,918, filed on Jul. 26, 2017, now Pat. No. 10,195,643, which is a
(Continued)

(51) Int. Cl.
*B05D 1/36* (2006.01)
*C03C 17/34* (2006.01)
(Continued)

(52) U.S. Cl.
CPC .......... *B05D 1/36* (2013.01); *B32B 17/10018* (2013.01); *B32B 17/10137* (2013.01); *B32B 17/10256* (2013.01); *B32B 17/10266* (2013.01); *B41J 3/407* (2013.01); *C03C 17/34* (2013.01); *C03C 17/3405* (2013.01); *B32B 2323/043* (2013.01); *B32B 2323/10* (2013.01); *B32B 2327/06* (2013.01); *B32B 2367/00* (2013.01);
(Continued)

(58) Field of Classification Search
None
See application file for complete search history.

(56) References Cited

U.S. PATENT DOCUMENTS 4,775,594 A   10/1988   Desjarlais
5,198,306 A    3/1993   Kruse
(Continued)

FOREIGN PATENT DOCUMENTS

CN   101784385 A   7/2010
EP     2089236 A1  8/2009
(Continued)

OTHER PUBLICATIONS

English Translation of CN201580008720.5 Office Action dated April 1, 2019; 10 Pages; Chinese Patent Office.
(Continued)

*Primary Examiner* — Michael P. Rodriguez

(57) ABSTRACT

A method for printing ink on a substrate comprising the steps of coating a glass substrate with an adhesion promoter, depositing one or more layers of ink on the coated substrate, and laminating the imaged substrate. The substrate can be a glass substrate, and the adhesion promoter can include a silane material, powder coating, organophosphate primer suspended in isopropanol.

8 Claims, 15 Drawing Sheets

Related U.S. Application Data division of application No. 14/618,398, filed on Feb. 10, 2015, now Pat. No. 9,724,727.

(60) Provisional application No. 61/939,439, filed on Feb. 13, 2014.

(51) Int. Cl.
  *B41J 3/407* (2006.01)
  *B32B 17/10* (2006.01)

(52) U.S. Cl.
  CPC .... *C03C 2217/72* (2013.01); *C03C 2218/119* (2013.01); *C03C 2218/31* (2013.01); *Y10T 428/24851* (2015.01)

(56) References Cited

U.S. PATENT DOCUMENTS

| | | | | |
|---|---|---|---|---|
| 5,569,638 | A | * | 10/1996 | Shirai ............... B41J 2/315 428/304.4 |
| 6,136,382 | A | | 10/2000 | Kamen et al. |
| 2006/0128572 | A1 | | 6/2006 | Lange et al. |
| 2011/0117286 | A1 | | 5/2011 | Chapel et al. |
| 2012/0021193 | A1 | | 1/2012 | Lecolley et al. |

FOREIGN PATENT DOCUMENTS

| | | |
|---|---|---|
| JP | 2004034675 | 2/2004 |
| WO | 2008035186 | 3/2008 |
| WO | 2010115858 | 10/2010 |
| WO | WO 2014196974 A1 * 12/2014 ............ B41M 5/508 |

OTHER PUBLICATIONS

Qian, "Ink formula design and printing manual," China Light Industry Press, 2004, pp. 524 (Translation Attached).

Chinese Patent Application No. 201580008720.5; English Translation of the Third Office Action dated Sep. 30, 2019; China Patent Office; 9 Pgs.

International Search Report of the International Searching Authority; CPT/US2015/015335; dated Sep. 15, 2015; 6 Pages; European Patent Office.

R Gy; Ion Exchange for Glass Strengthening; Materials Science and Engineering B; 149 (2008) 159-165.

Werner E. Haas in "Imaging Processes and Materials," Ed. by Sturge, Walworth & Shepp.

English Translation of CN201580008720.5 First Office Action dated Jul. 26, 2018, China Patent Office.

* cited by examiner

Interval Plot of L
95% CI for the Mean
Test=DampHeat-SP

Interval Plot of L
95% CI for the Mean
Test=High Temp-SP

Individual Value Plot of L
Test=Damp Heat−SP

Individual Value Plot of a
Test=High Temp−SP

Individual Value Plot of a
Test=Thermal Cycling–SP

Individual Value Plot of b
Test=Damp Heat–SP

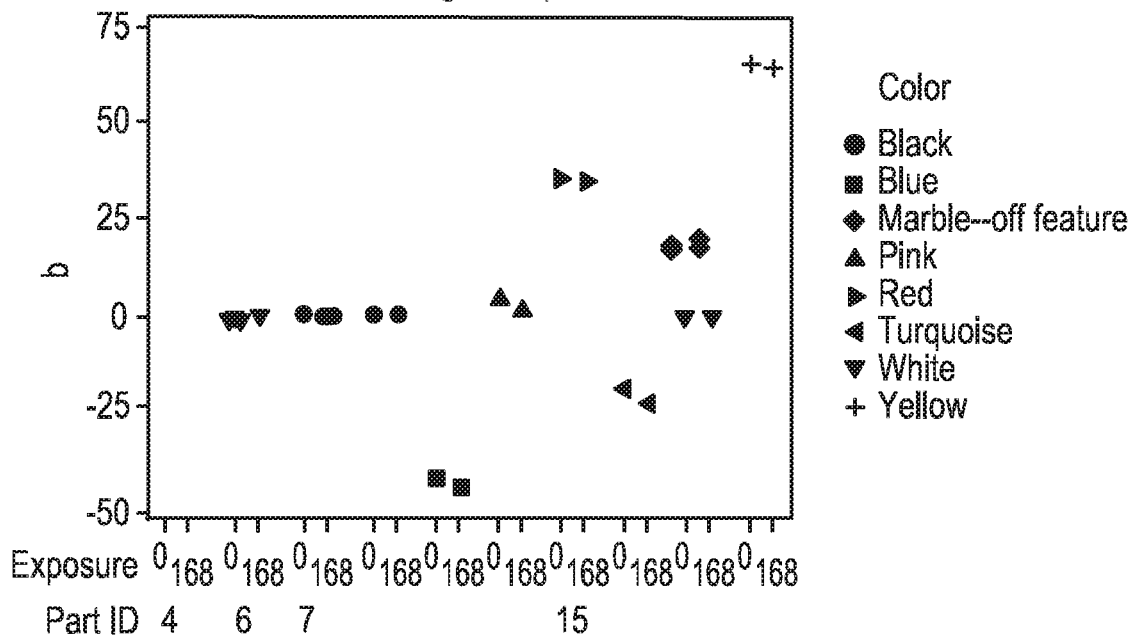
FIG. 5M Individual Value Plot of b Test= High Temp--SP
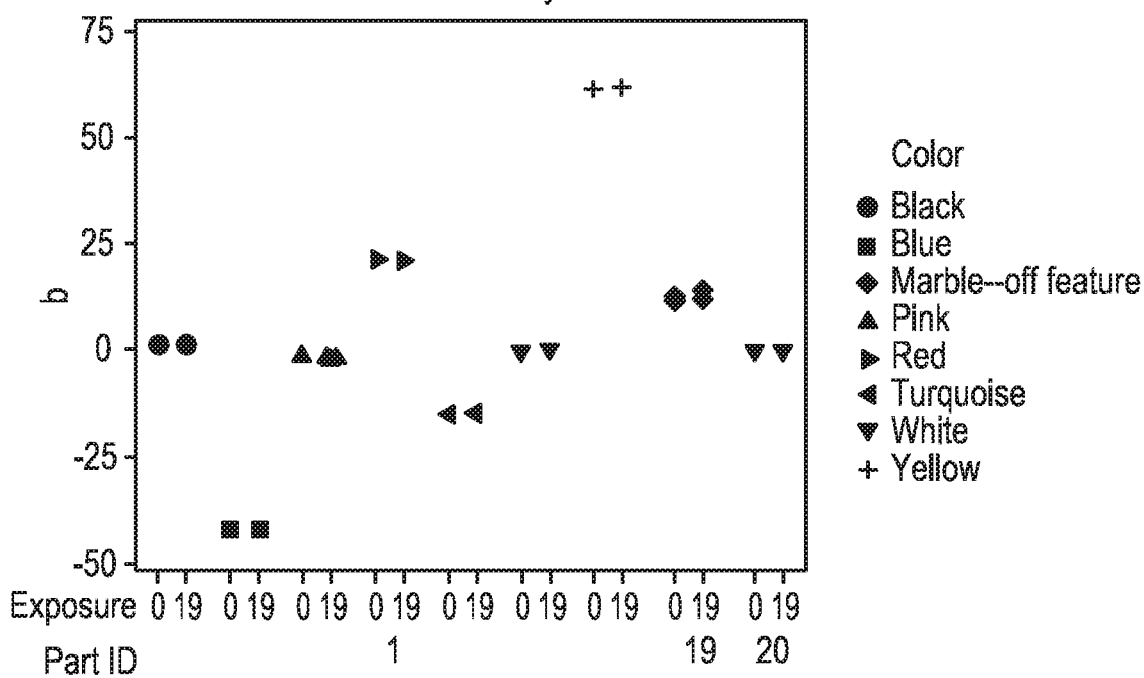
FIG. 5N Individual Value Plot of b Test= Thermal Cycle--SP Pummel Rating Scale Interval Plot of Pummel
95% CI for the Mean

METHODS FOR PRINTING ON GLASS

CROSS-REFERENCE TO RELATED APPLICATIONS

This application is a divisional application and claims the benefit of priority under 35 U.S.C. § 120 of U.S. application Ser. No. 15/659,918, filed on Jul. 26, 2017, which is a divisional application and claims the benefit of priority under 35 U.S.C. § 120 of U.S. application Ser. No. 14/618, 398, filed Feb. 10, 2015, which claims the benefit of priority under 35 U.S.C. § 119 of U.S. Provisional Application Ser. No. 61/939,439, filed on Feb. 13, 2014, the contents of which are relied upon and incorporated herein by reference in their entirety.

BACKGROUND

The use of ink jet printing processes in the manufacture of multicolor images is known in the art. In such processes, ink droplets can be emitted from a nozzle and deposited on substrates to form an image. To obtain quality images, rapid absorption of the ink into the substrate is required, but at the same time the ink colorant must be retained at or near the surface of the substrate with lateral ink migration limited to the resolution of the printer.

To achieve high quality images in ink jet printing, the substrate can be coated with a formulation to meet certain requirements. Although paper stock is extensively used as a substrate for ink jet printing, many other materials can be used including plastic films and sheets, fabrics, metals, wood, glass, and the like. When transparencies are to be produced, typically a coated transparent plastic film or sheet is used as the substrate. Since aqueous based inks are a common type of ink used in ink jet printing processes, substrate coating formulations typically are hydrophilic and contain appropriate absorptive materials. Such coated substrates are described in U.S. Pat. Nos. 4,775,594 and 5,198, 306. The '594 patent describes an ink jet transparency with wetting properties resulting in even surface distribution of ink on the transparency. The transparency comprises a transparent resinous support and a clear coating thereon containing a water soluble resin, a water insoluble resin, a fluorosurfactant, and non-volatile organic acid including glycolic, methoxy acetic, dibasic carboxylic, or tribasic carboxylic acid. The '306 patent describes a recording transparency and its method of preparation from a water solution. The transparency comprises a transparent substrate and a coating of a synthetic transparent cellulosic polymer and a surfactant composition comprising nonionic detergent, anionic detergent and complexing agent.

Conventional ink jet printing processes, inks and substrates are capable of producing high quality four color images on paper substrates in sizes ranging from office copy up to sizes useful for posters, displays and billboards. However, application of ink jet printing has been limited largely to typical office uses such as copy and the like where environmental and abrasion damage to the finished ink image is unlikely to occur. When used as posters, displays, billboards and when used with glass substrates, water sensitive ink jet images and underlying substrates must be protected from rain, sunlight (UV), and other environmental contaminants and should likewise be protected from abrasion and graffiti to provide adequate useful life to the image displayed. There also continues to be an industry need for a process to provide protected, durable, distortion-free, scratch-resistant, UV and humidity resistant, full-color ink jet images for use on large format posters, billboards, planar surfaces, architectural surfaces, appliances, non-planar surfaces, and the like.

SUMMARY

Some embodiments of the present disclosure include a method for printing ink on a glass substrate. The method includes coating a glass substrate with a silane material, depositing a first layer of ink on the coated glass substrate, depositing a second layer of ink over the first layer of ink, and depositing a powder coating onto the second layer of ink.

Other embodiments include a method for printing ink on a glass substrate having the steps of depositing a first powder coating on a glass substrate, depositing a first layer of ink on the coated glass substrate, depositing a second layer of ink over the first layer of ink, and depositing a second powder coating onto the second layer of ink.

Additional embodiments include a method for printing ink on a substrate comprising the steps of coating a glass substrate with an adhesion promoter, depositing a first layer of ink on the coated substrate, depositing a second layer of ink over the first layer of ink, and depositing a powder coating onto the second layer of ink.

Another embodiment includes a method for printing ink on a substrate comprising the steps of pretreating a glass substrate, depositing one or more layers of ink on the pretreated glass substrate, overprinting the deposited one or more layers of ink with an overcoat, and curing the overprinted glass substrate to encapsulate the deposited one or more layers of ink.

Additional embodiments include a method for printing ink on a substrate comprising the steps of pretreating a substrate with an organophosphate primer suspended in an isopropanol solution, depositing one or more layers of ink on a first surface of the pretreated substrate, and laminating a film onto to the first surface to form an imaged laminate.

Yet another embodiment includes a laminate comprising a substrate pretreated with an organophosphate primer suspended in an isopropanol solution, one or more layers of ink deposited on a first surface of the pretreated substrate, and a film laminated on the one or more layers to form an imaged laminate.

Additional features and advantages of the claimed subject matter will be set forth in the detailed description which follows, and in part will be readily apparent to those skilled in the art from that description or recognized by practicing the claimed subject matter as described herein, including the detailed description which follows, the claims, as well as the appended drawings.

It is to be understood that both the foregoing general description and the following detailed description present embodiments of the present disclosure, and are intended to provide an overview or framework for understanding the nature and character of the claimed subject matter. The accompanying drawings are included to provide a further understanding of the present disclosure, and are incorporated into and constitute a part of this specification. The drawings illustrate various embodiments and together with the description serve to explain the principles and operations of the claimed subject matter.

BRIEF DESCRIPTION OF THE DRAWINGS

For the purposes of illustration, there are forms shown in the drawings that are presently preferred, it being under

DETAILED DESCRIPTION

Figure 1:
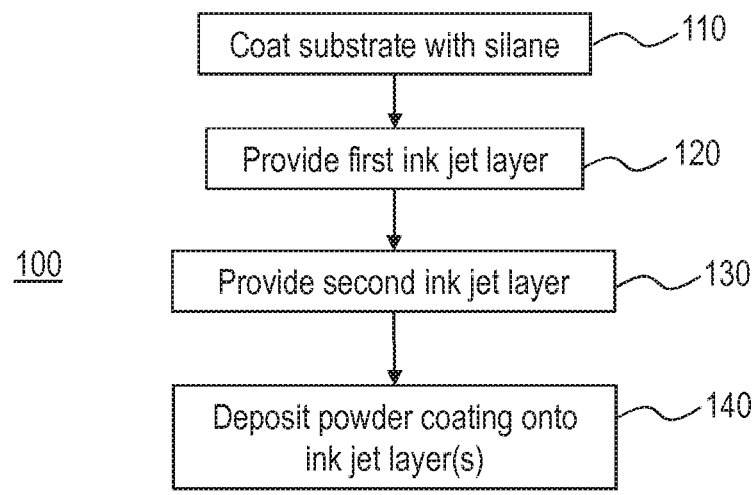
- FIG. 1 is a diagram of an exemplary procedure for one embodiment of the present disclosure.

In the following description, like reference characters designate like or corresponding parts throughout the several views shown in the figures. It is also understood that, unless otherwise specified, terms such as "top," "bottom," "outward," "inward," and the like are words of convenience and are not to be construed as limiting terms. In addition, whenever a group is described as comprising at least one of a group of elements and combinations thereof, it is understood that the group may comprise, consist essentially of, or consist of any number of those elements recited, either individually or in combination with each other.

Similarly, whenever a group is described as consisting of at least one of a group of elements or combinations thereof, it is understood that the group may consist of any number of those elements recited, either individually or in combination with each other. Unless otherwise specified, a range of values, when recited, includes both the upper and lower limits of the range. As used herein, the indefinite articles "a," and "an," and the corresponding definite article "the" mean "at least one" or "one or more," unless otherwise specified.

The following description of the present disclosure is provided as an enabling teaching thereof and its best, currently-known embodiment. Those skilled in the art will recognize that many changes can be made to the embodiment described herein while still obtaining the beneficial results of the present disclosure. It will also be apparent that some of the desired benefits of the present disclosure can be obtained by selecting some of the features of the present disclosure without utilizing other features. Accordingly, those who work in the art will recognize that many modifications and adaptations of the present disclosure are possible and may even be desirable in certain circumstances and are part of the present disclosure. Thus, the following description is provided as illustrative of the principles of the present disclosure and not in limitation thereof.

Those skilled in the art will appreciate that many modifications to the exemplary embodiments described herein are possible without departing from the spirit and scope of the present disclosure. Thus, the description is not intended and should not be construed to be limited to the examples given but should be granted the full breadth of protection afforded by the appended claims and equivalents thereto. In addition, it is possible to use some of the features of the present disclosure without the corresponding use of other features. Accordingly, the following description of exemplary or illustrative embodiments is provided for the purpose of illustrating the principles of the present disclosure and not in limitation thereof and may include modification thereto and permutations thereof.

Ink jet technology is not conventionally employed for production of printing techniques on non-porous media, e.g., glass or other substrates, due to low adhesion characteristics on these substrates. Pretreatment of glass substrates has been employed in the industry; however, such methods have heretofore been unsuccessful in achieving high-quality prints. For example, pretreatment sprays such as, but not limited to, silane or other primers, have been utilized by the industry to increase the adhesion characteristics of ink to glass substrates to the level of other printing technologies (e.g., screen printing, pad printing) but this alone does not provide high quality adhesion characteristics. While some embodiments reference ink jet printing on glass substrates, the claims appended herewith should not be so limited as embodiments are applicable to other methods of printing such as, but not limited to, direct-to-substrate printing, dye sublimation, pad printing, etc. as well as other media, e.g., plastics, ceramics, etc.

Some embodiments of the present disclosure, however, can utilize conventional silane, or other, pretreatment methods and can incorporate a powder coating protective layer to encapsulate the decorative ink jet layer. This can therefore protect the printed substrate from the environment or other external events (e.g., scratching, etc.). In additional embodiments, the powder coating layer can be used as a color backer to broaden the ink jet color gamut (i.e., powder coating comes in a metallic silver, ink jet does not).

FIG. 1 is a diagram of an exemplary procedure for one embodiment of the present disclosure. With reference to FIG. 1, a procedure 100 is illustrated for providing a high quality printed image on a glass substrate. In step 110, an exemplary substrate such as, but not limited to, a glass substrate can be pre-treated with an adhesion promoter. An exemplary adhesion promoter utilized by some embodiments can be silane to increase ink adhesion to the substrate. In some embodiments, step 110 can include cleaning the substrate, pyrolysis of the substrate and then spraying of a silane treatment on the substrate. Of course, other methods of providing a silane treatment onto a substrate are envisioned and such an example should not limit the scope of the claims appended herewith. For example, a silane treatment can be provided on a substrate by dipping, vapor deposition, painting, printing, etc. Exemplary silanes can include silanes having no functional groups or one or more functional groups. Some functional silanes or silanols can be utilized to assist in the adhesion of inks to the underlying substrate. Non-limiting compounds having 2 reactive silyl groups include hydroxy terminated polydimethylsiloxanes and polydiethylsiloxanes (i.e., having Si—OH terminal groups). Other compounds can include three or more reactive silyl groups per molecule, e.g., alkoxy silyl or acyloxy silyl groups, 1,3-dimethyltetramethoxydisiloxane, methacryloxypropyl-trimethoxysilane, tetraethoxy-silane, 1,3-dioctyltetramethoxy-disiloxane, glycidoxypropyltrimethoxysilane, 3-bromopropyltrimethoxysilane, and dioctyltetraethoxydisiloxane, to name a few. In step 120, a first ink layer can be deposited or provided over the coated substrate. This first ink layer can be deposited using conventional ink jet technology and can include any various artwork, customized or otherwise. Step 120 can include depositing one or more ink images on the substrate. For example, an ink jet device can traverse over the substrate and deposit ink droplets on the coated substrate to form an imaged layer. An exemplary ink jet device can be any conventional ink jet printer used to print a single color or a full color image. Conventional ink jet printing methods and devices are disclosed by Werner E. Haas in "Imaging Processes and Materials," Ed. by Sturge, Walworth & Shepp, which is incorporated herein in its entirety by reference thereto. Additional ink jet devices include, but are not limited to, Hewlett Packard Desk Jet 500 and 500C printers, IBM Lexmark® ink jet printers, Cannon Bubblejet® printers, NCAD Computer Corporation Novajet® printers, and the like. In this step, a single color ink image, e.g., black, green, etc., can be deposited or several colors can be deposited either in sequence or simultaneously, to form an ink imaged layer, e.g., a four color subtractive color image including yellow, magenta, cyan and black images in register. Unless the printed ink layer is to be used in the manufacture of a transparency, the ink image typically is printed on the substrate as a reverse or mirror image so that the completed protected ink image will possess correct orientation when applied to an opaque substrate. Exemplary inks used in embodiments include ink compositions such as, but not limited to, liquid compositions comprising a solvent or carrier liquid, dyes or pigments, humectant, organic solvents, detergents, thickeners, preservatives, and the like. The solvent or carrier liquid can typically be water, although ink in which organic materials such as polyhydric alcohols as the predominant solvent or carrier can also be used. The dyes used in such compositions are typically water-soluble direct or acid type dyes.

In step 130, a second ink layer can be deposited onto the first ink layer also using ink jet technology described above. Of course, this second ink layer can utilize the same or different technology than what was used to deposit the first layer. In some embodiments, the second ink layer can be solid white (or another suitable color(s)) to reduce or eliminate the transparency of the underlying glass substrate and provide a clearer picture of the image deposited in the first layer to an observer. In step 140, a powder coating can be deposited onto the second ink layer to provide a scratch- and environmentally-resistant coating for the ink layers. Exemplary powder material can include inorganic particles such as silicas, chalk, calcium carbonate, magnesium carbonate, kaolin, calcined clay, pyrophylite, bentonite, zeolite, talc, synthetic aluminum and calcium silicates, diatomatious earth, anhydrous silicic acid powder, aluminum hydroxide, barite, barium sulfate, gypsum, calcium sulfate, and the like. Suitable powder material can also include organic particles such as polymeric beads including beads of polymethylmethacrylate, copoly(methylmethacrylate/divinylbenzene), polystyrene, copoly (vinyltoluene/t-butylstyrene/methacrylic acid), polyethylene, and the like. The composition and particle size of the particles can be selected so as not to impair the transparent nature of the deposited ink. The powder material can be substantially transparent or can include a colorant. In some embodiments, the powder material can include components which strongly absorb ultraviolet radiation thereby reducing damage to underlying images by ambient ultraviolet light, e.g., such as 2-hydroxybenzophenones; oxalanilides, aryl esters and the like, hindered amine light stabilizers, such as bis(2,2,6,6-tetramethyl-4-piperidinyl) sebacate and the like, and combinations thereof. Other suitable powder coatings can include thermally activated, hydrophilic, adhesive material comprised of thermoplastic polyurethanes, polycaprolactone, acrylic copolymers, and combinations thereof. In some embodiments, the coated substrate can then be heat-treated or cured.

Figure 2:
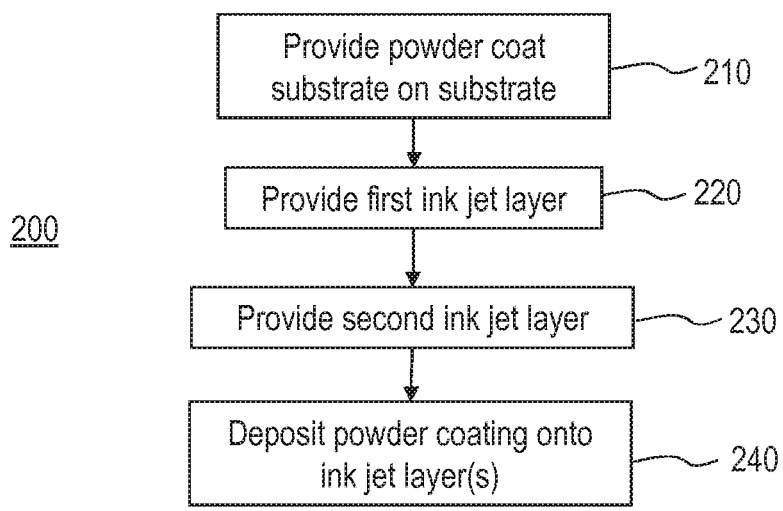
FIG. 2 is a diagram of an exemplary procedure for another embodiment of the present disclosure.

FIG. 2 is a diagram of an exemplary procedure for another embodiment of the present disclosure. With reference to FIG. 2, a procedure 200 is illustrated for providing a high quality printed image on a glass substrate. In step 210, an exemplary substrate such as, but not limited to, a glass substrate can be pre-treated with an adhesion promoter. An exemplary adhesion promoter utilized by some embodiments can be a powder coating which is sprayed directly on the glass to increase ink adhesion to the substrate. Other adhesion promoters can include 3-glycidoxypropyltrimethoxysilane (DOW Z-6040 from Dow Corning), tris[3-(trimethoxysilyl)propyl]-isocyanurate (Geniosil GF 69 from Wacker), aminopropyl triethoxy silane, bis(trimethoxysilylpropyl)amine, or combinations thereof. In some embodiments, step 210 can also include curing or heating of the powder coating on the substrate. Exemplary powder material can include inorganic particles such as silicas, chalk, calcium carbonate, magnesium carbonate, kaolin, calcined clay, pyrophylite, bentonite, zeolite, talc, synthetic aluminum and calcium silicates, diatomatious earth, anhydrous silicic acid powder, aluminum hydroxide, barite, barium sulfate, gypsum, calcium sulfate, and the like. Suitable powder material can also include organic particles such as polymeric beads including beads of polymethylmethacrylate, copoly(methylmethacrylate/divinylbenzene), polystyrene, copoly (vinyltoluene/t-butylstyrene/methacrylic acid), polyethylene, and the like. The composition and particle size of the particles can be selected so as not to impair the transparent nature of the ink to be deposited. The powder material can be substantially transparent or can include a colorant. In some embodiments, the powder material can include components which strongly absorb ultraviolet radiation thereby reducing damage to underlying images by ambient ultraviolet light, e.g., such as 2-hydroxybenzophenones; oxalanilides, aryl esters and the like, hindered amine light stabilizers, such as bis(2,2,6,6-tetramethyl-4-piperidinyl) sebacate and the like, and combinations thereof. This first powder coating can be utilized to permanently adhere printed ink to the underlying substrate. Other suitable powder coatings can include thermally activated, hydrophilic, adhesive material comprised of thermoplastic polyurethanes, polycaprolactone, acrylic copolymers, and combinations thereof.

In step 220, a first ink layer can be deposited or provided over the coated substrate. This first ink layer can be deposited using conventional ink jet technology and can include any various artwork, customized or otherwise. Step 220 can include depositing one or more ink images on the substrate. For example, an ink jet device can traverse over the substrate and deposit ink droplets on the coated substrate to form an imaged layer. An exemplary ink jet device can be any conventional ink jet printer used to print a single color or a full color image. Conventional ink jet printing methods and devices are disclosed by Werner E. Haas in "Imaging Processes and Materials," Ed. by Sturge, Walworth & Shepp, which is incorporated herein in its entirety by reference thereto. Additional ink jet devices include, but are not limited to, Hewlett Packard Desk Jet 500 and 500C printers, IBM Lexmark® ink jet printers, Cannon Bubblejet® printers, NCAD Computer Corporation Novajet® printers, and the like. In this step, a single color ink image, e.g., black, green, etc., can be deposited or several colors can be deposited either in sequence or simultaneously, to form an ink imaged layer, e.g., a four color subtractive color image including yellow, magenta, cyan and black images in register. Unless the printed ink layer is to be used in the manufacture of a transparency, the ink image typically is printed on the substrate as a reverse or mirror image so that the completed protected ink image will possess correct orientation when applied to an opaque substrate. Exemplary inks used in embodiments include ink compositions such as, but not limited to, liquid compositions comprising a solvent or carrier liquid, dyes or pigments, humectant, organic solvents, detergents, thickeners, preservatives, and the like. The solvent or carrier liquid can typically be water, although ink in which organic materials such as polyhydric alcohols as the predominant solvent or carrier can also be used. The dyes used in such compositions are typically water-soluble direct or acid type dyes. In step 230, a second ink layer can be deposited onto the first ink layer also using ink jet technology described above. Of course, this second ink layer can utilize the same or different technology than what was used to deposit the first layer. In some embodiments, the second ink layer can be solid white (or another suitable color(s)) to reduce or eliminate the transparency of the underlying glass substrate and provide a clearer picture of the image, deposited in the first layer, to an observer. In step 240, a second powder coating can be deposited onto the second ink layer to provide a scratch- and environmentally-resistant coating for the ink layers. The material utilized in the second powder coating can be the same or different than the first powder coating as described above. The second powder coating can be substantially transparent or can include a colorant. In some embodiments, the coated substrate can then be heat-treated or cured.

Figure 3:
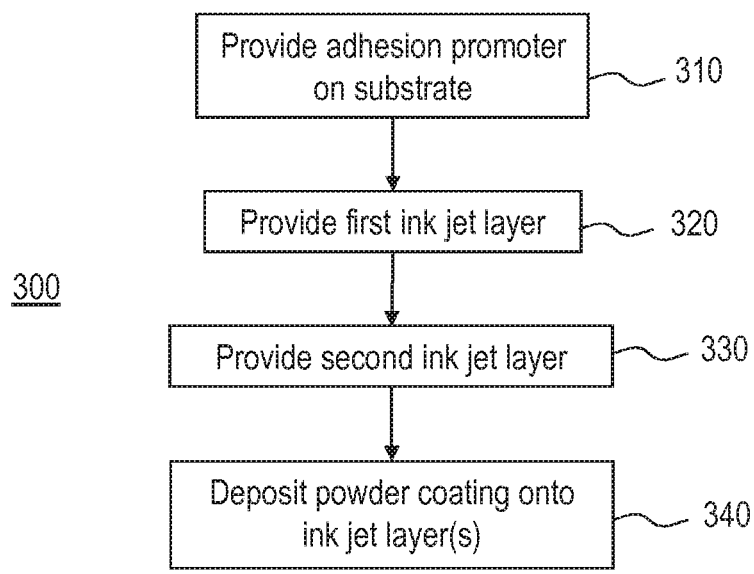
FIG. 3 is a diagram of an exemplary procedure for a further embodiment of the present disclosure.

FIG. 3 is a diagram of an exemplary procedure for a further embodiment of the present disclosure. With reference to FIG. 3, a procedure 300 is illustrated for providing a high quality printed image on a glass substrate. In step 310, an exemplary substrate such as, but not limited to, a glass substrate can be pre-treated with an adhesion promoter. Exemplary adhesion promoters include, but are not limited to, silanes and powder coatings, each of which are described above with reference to FIGS. 1 and 2, respectively. As glass is a non-porous substrate with a relatively inert surface, UV inks do not generally adhere to glass without an adhesion promoter. For example, using an ASTM standard cross-hatch test, tape can easily remove ink from the glass once pulled if no adhesion promoter is employed. Silane-based adhesion promoter can be applied to the glass substrate. In some embodiments, the substrate can be wiped with a conventional solvent, torch treated and then sprayed with an exemplary silane primer. In step 320, a first ink layer can be deposited or provided over the coated substrate. This first ink layer can be deposited using conventional ink jet technology and can include any various artwork, customized or otherwise. In step 330, a second ink layer can be deposited onto the first ink layer also using ink jet technology. This second ink layer can utilize the same or different technology than what was used to deposit the first layer. In some embodiments, the second ink layer can be solid white (or another suitable color(s)) to reduce or eliminate the transparency of the underlying glass substrate and provide a clearer picture of the image deposited in the first layer to an observer. In step 340, a powder coating can be deposited onto the second ink layer to provide a scratch- and environmentally-resistant coating for the ink layers. This powder coating can be substantially transparent or can include a colorant. In some embodiments, the coated substrate can then be heated or cured.

While substrates heretofore have been generically referred to as substrates or glass substrates, the claims appended herewith are applicable to any type of substrate, glass or otherwise (metal, transparent film, etc.). In some embodiments having a glass substrate, the glass can be chemically-strengthened or non-chemically-strengthened glass. For those chemically strengthened embodiments, an ion exchange process can be utilized which can comprise exchanging Na, Li or Na and Li ions in the surface of the glass for large alkali ions. The ion-exchange can occur to a depth of approximately 40 µm from the surface of the glass substrate. Of course, the depth of ion-exchange can be greater or less than 40 µm. For example, some embodiments can include chemically strengthened glass (e.g., Gorilla Glass) having a high compressive stress (CS) level, a relatively high depth of compressive layer (DOL), and/or moderate central tension (CT). The thicknesses of this glass can range from 0.3 mm to 2.1 mm or greater. Other embodiments can include thinner chemically strengthened or non-chemically strengthened glass such as Willow Glass. Such thicknesses can be less than 0.5 mm to 0.1 mm or thinner. It is also contemplated that the glass substrate can be a soda lime glass, an alkali containing aluminosilicate glass, an alkali containing aluminoborosilicate glass, an alkali containing borosilicate glass, an alkali containing glass-ceramic or other glass known by those skilled in the art.

Utilizing embodiments described herein, an exemplary powder coating can prevent damage to the ink layer and therefore create an industry accepted ink jet on glass product. By printing on the backside of the glass and encapsulating the ink jet layer with a hardened powder coating layer, the problem of durability can be solved. Further, in some embodiments, by spraying a layer of powder coating directly on the glass, printing on the powder coating, and then encapsulating with another layer of powder coating the adhesion problem can be solved.

Exemplary embodiments provide cost effective powder coatings that are recyclable and emit zero or near zero volatile organic compounds. Embodiments can also provide high temperature resistance, high fracture toughness, cracking resistance, and protection of underlying ink jet layers. Exemplary embodiments can also utilize a transparent powder coating layer or a color powder coating layer to encapsulate the image and also to broaden the ink jet color gamut. Through such processes, exemplary embodiments can utilize antimicrobial additives to one or more surfaces of the glass substrate and can provide color stability and hermetic sealing of images not provided by conventional processes. Exemplary processes described above can meet chemical testing and hardness and scratch testing after water bath, cyclic moisture, dry heat, NaOH, $H_2SO_4$, and mineral oil exposures. Further, exemplary processes described above can meet mechanical testing such as a 5B rating on cross-hatch adhesion tests and above a 3H rating on pencil hardness tests. Embodiments herein also provide a broader range of thermal stability, the ability for use of ink jetted glass substrates in external environments, use of ink jetted glass substrates in lighting and informational applications. Due to the various uses of chemically strengthened glass as a glass substrate, additional applications include anti-counterfeiting codes, anti-graffiti applications, printing of unique codes on curved glass, customized artwork on curved substrates (e.g., appliances) and customized decorated glass for automotive applications.

According to some embodiments, photographic images or art work reproductions can be printed and made into "framed pictures" to be displayed as wall décor or on a desk or some other surface in the home or office environment. Other methods of displaying such pictures according to embodiments herein can use non-framed media such as canvas, metal, wood, acrylic or glass. An alternative to direct printing can be to mount a conventionally processed (e.g., wet processed) photograph on a substrate which takes advantage of the highly mature photo printing methods and adds a modern look to the final product. Some embodiments can employ dye sublimation which utilizes specialty inks and a conventional inkjet printer. Exemplary inks can contain dyes that sublimate at high temperature, typically around 200° C. In such an exemplary method, one can first print an image onto a transfer media whereby the image can be placed on the final substrate that is to be coated with a dye-receiving material. This stack can then be heated to approximately 200° C. under constant pressure whereby dye molecules leave the transfer media and form a color image on the substrate. In a dye sublimation process, the image quality can be photographic and indistinguishable from a real photograph when first made. In some embodiments, a top coat with an exemplary UV absorbing material can be used to prolong the transferred image life.

In other embodiments, UV inkjet printing can be utilized to produce quality images with exemplary UV endurance. Some inks can be pigment-based and dispersed in a UV-curable clear liquid. For example, in some embodiments the pigment can be carbon black, iron pigment, cobalt pigment, black spinel, cadmium pigment, chromium pigment, titanium pigment, zinc pigment, lead pigment, magnesium pigment, vanadium pigment, copper chromite black spinel, or combinations thereof. Other pigments known to those in the art can also be used. Curing of such inks can be performed by a UV lamp in the vicinity of or adjacent the inkjet printer. Instant curing of ink droplets can enable printing on a wide range of substrate media including many non-porous types such as ceramic and glass.

Figure 4:
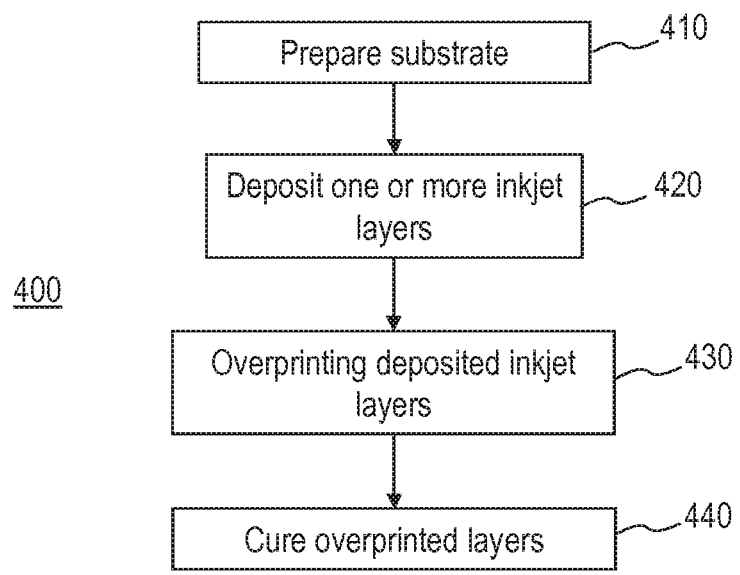
FIG. 4 is a diagram of an exemplary procedure for an additional embodiment of the present disclosure.

FIG. 4 is a diagram of an exemplary procedure for an additional embodiment of the present disclosure. With reference to FIG. 4, a procedure 400 is illustrated for providing a high quality printed image on a substrate. In step 410, an exemplary substrate such as, but not limited to, a glass substrate can be prepared by cleaning the substrate of contaminates (organic and inorganic). In some embodiments, this can be accomplished using typical glass cleaning methods (alcohol, Windex-type cleaners, etc.). In another embodiment, step 410 can include pre-treating the substrate with an adhesion promoter. Depending upon the ink formulation used, an adhesion promoter may be required which includes, but is not limited to, silanes, powder coatings, or other adhesion promoters each of which are described above with reference to FIGS. 1, 2 and 3. In step 420, one or more ink layers can be deposited or provided over the cleaned and/or coated substrate. These ink layers can be deposited using conventional ink jet technology or other technology described above and can include any various artwork, customized or otherwise. In some embodiments, the layer(s) can be opaque or can be semi-transparent to take advantage of the color of an encapsulation layer to be added in a further step. In step 430, the deposited ink layers can be overprinted with a screen print for encapsulation purposes. For example, using a screen print ink color of choice (e.g., white, black, or other suitable color), an overcoat of a solid color can be deposited on the ink layers to reduce or eliminate the transparency of the underlying glass substrate and provide a clearer picture of the image deposited in the first layer to an observer. In step 440, the deposited ink layers and overprinted coat can then be cured to thereby encapsulate the images formed by the ink layers and/or coat. In some embodiments, the step 440 includes curing the ink using a UV lamp, a heat lamp, etc. In another embodiment, a powder coating can be deposited onto the ink layers to provide a scratch and environmentally-resistant coating therefor. This coated substrate can also be heated or cured.

Figure 5A:
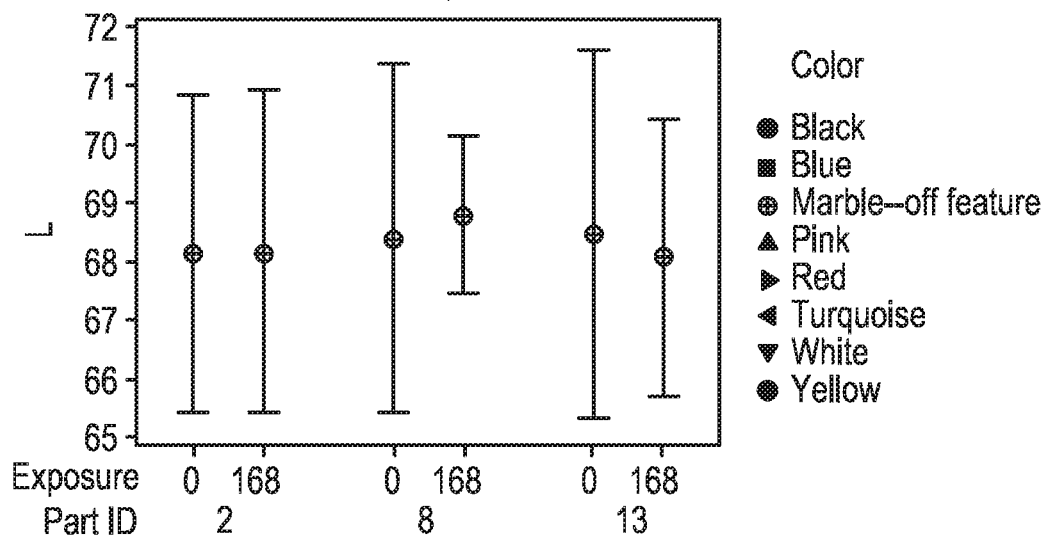
FIGS. 5A-5N are plots of exemplary embodiments measured for color shift with a spectrometer after certain experiments.
Figure 5B:
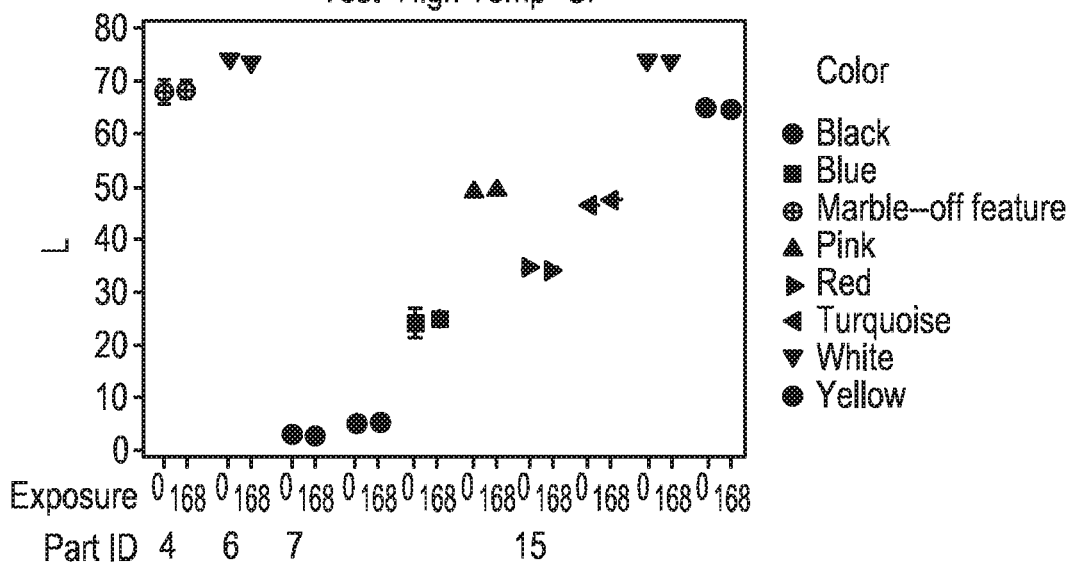
Figure 5C:
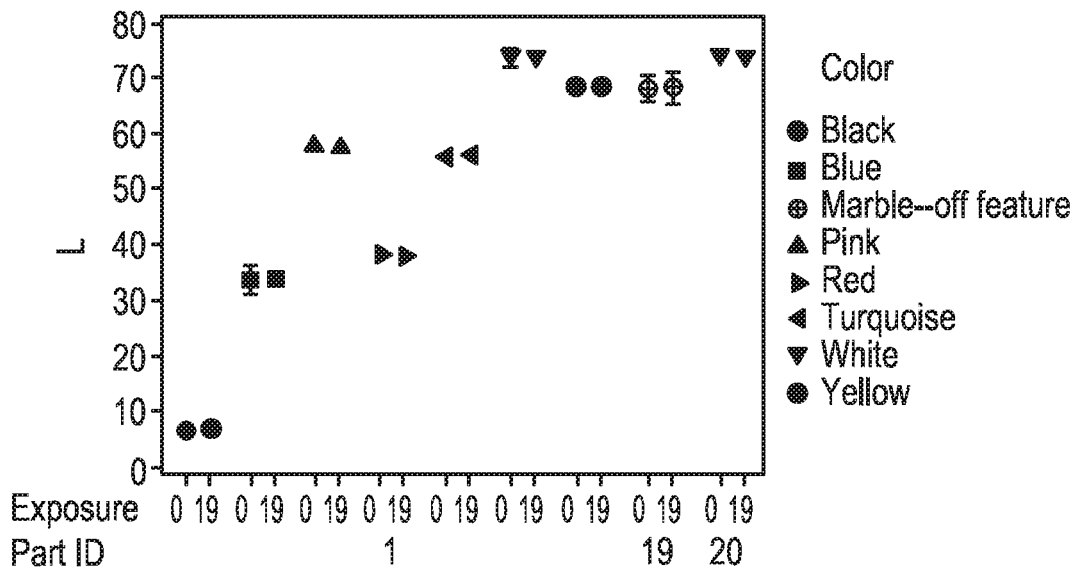
Figure 5D:
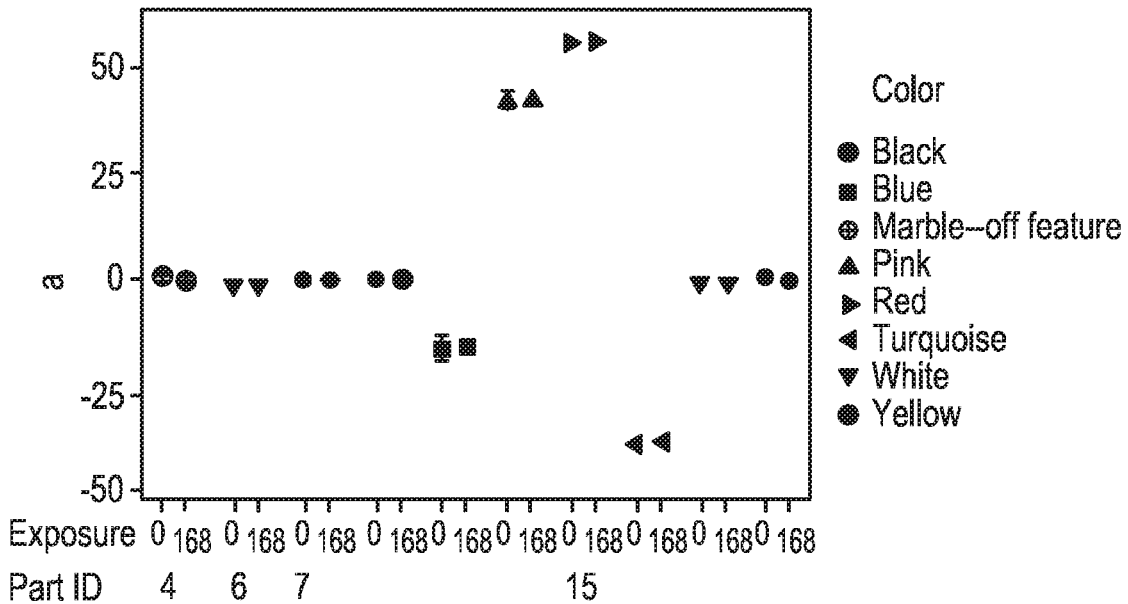
Figure 5E:
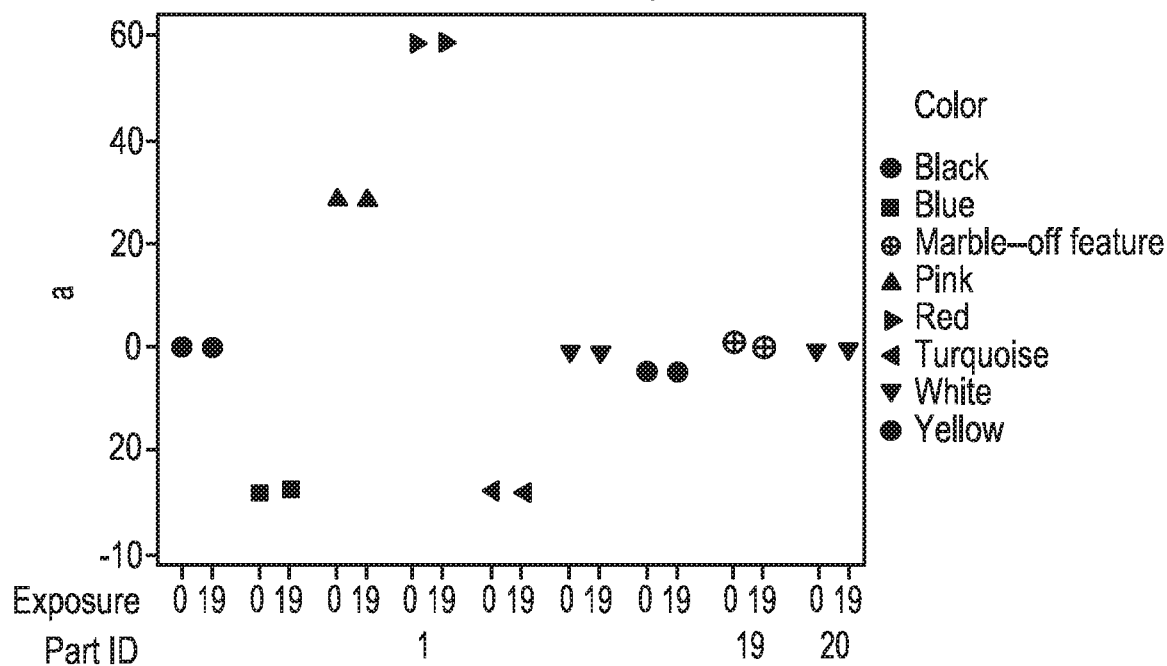
Figure 5F:
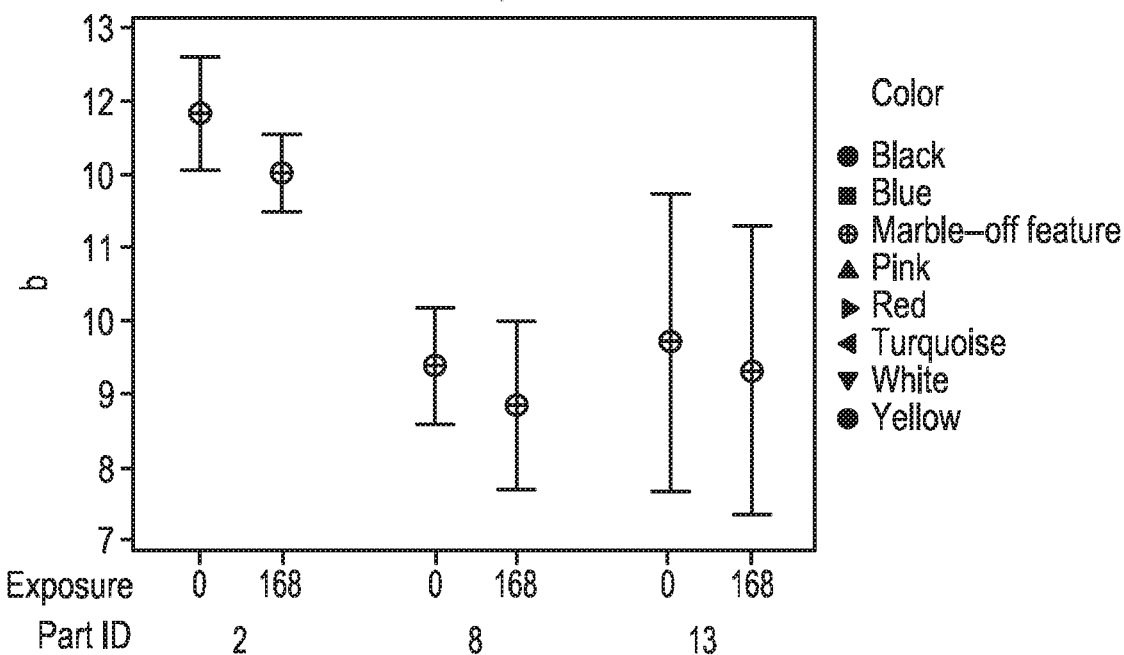
Figure 5G:
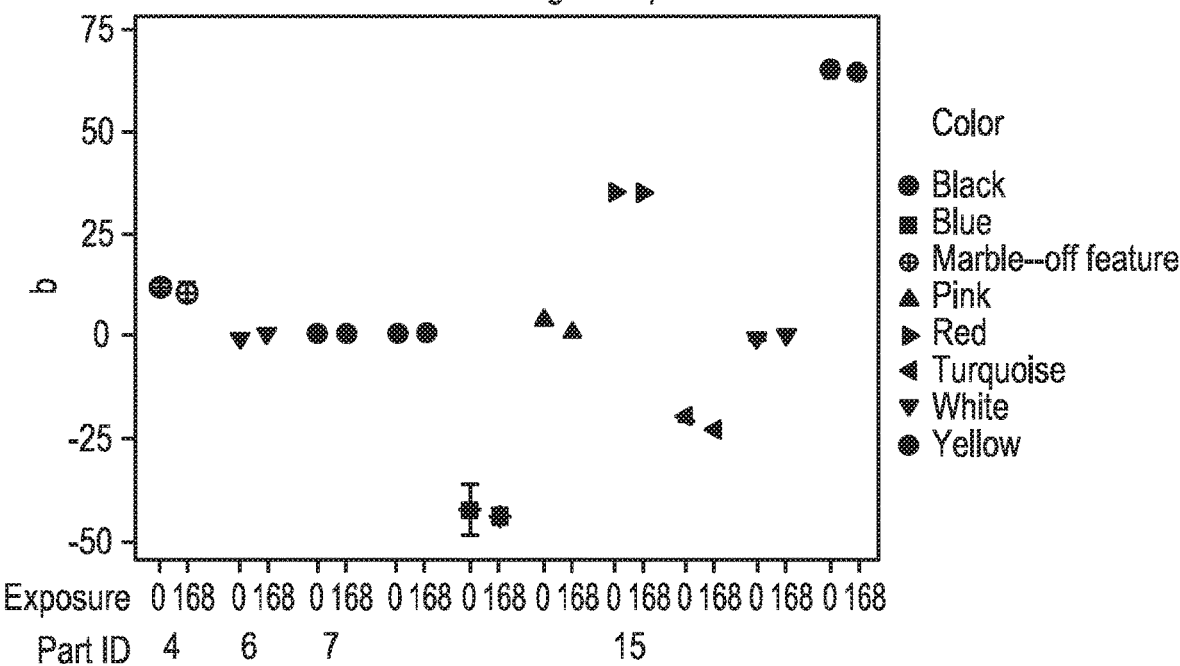
Figure 5H:
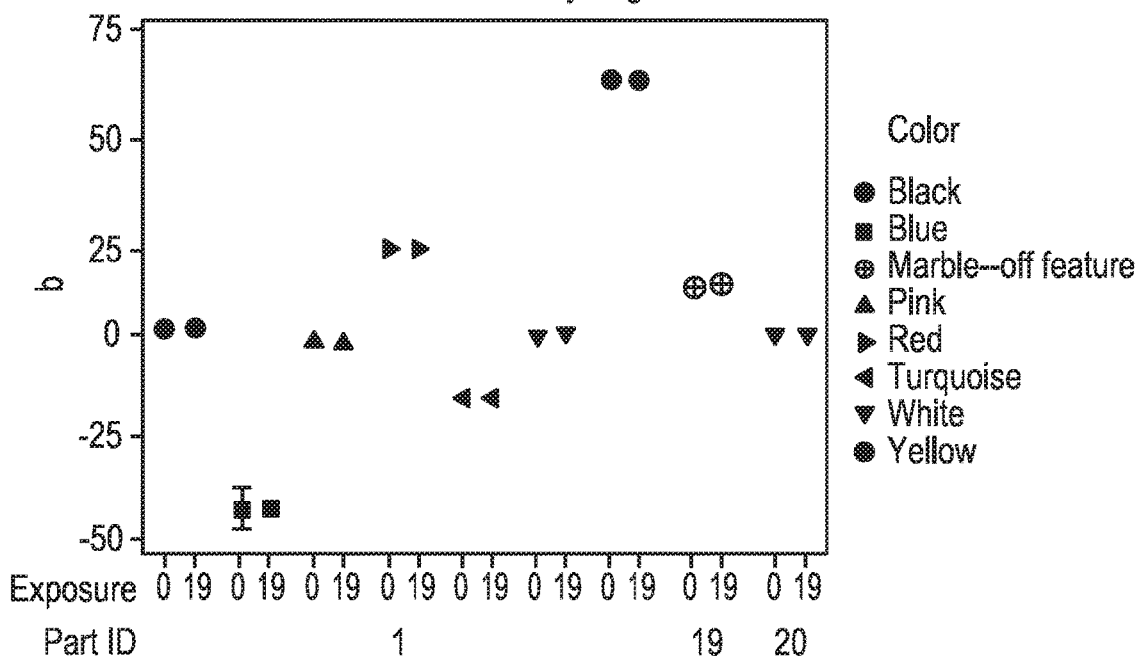
Figure 5I:
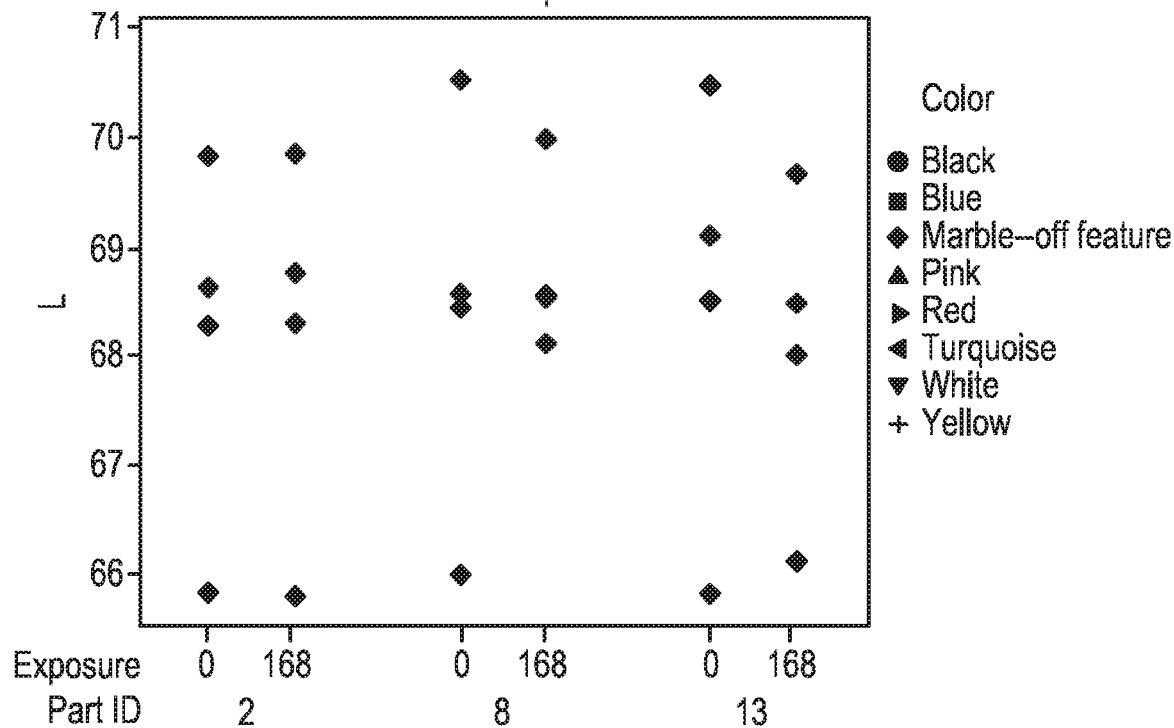
Figure 5J:
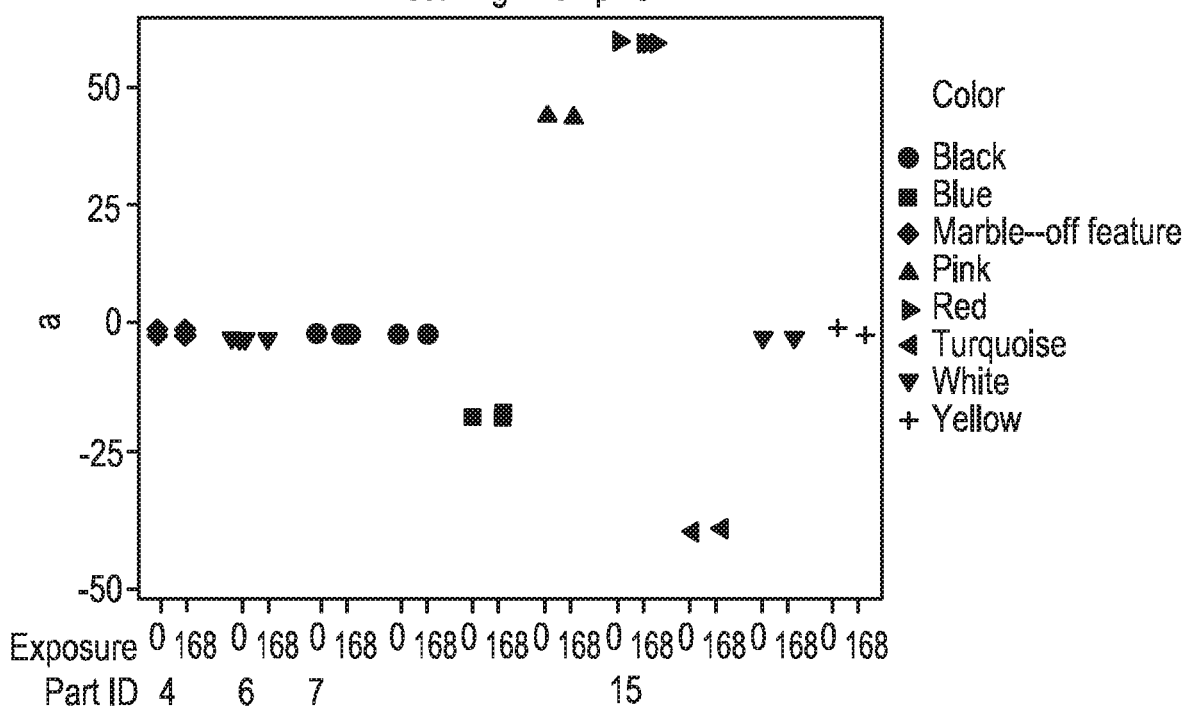
Figure 5K:
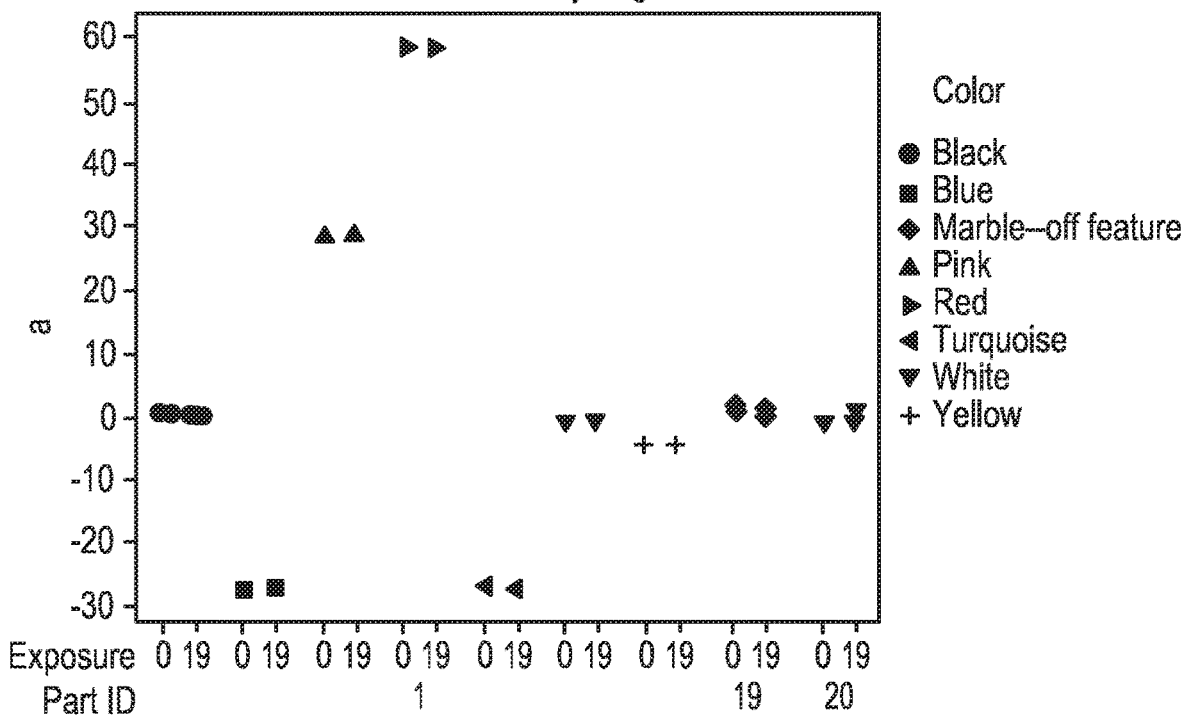
Figure 5L:
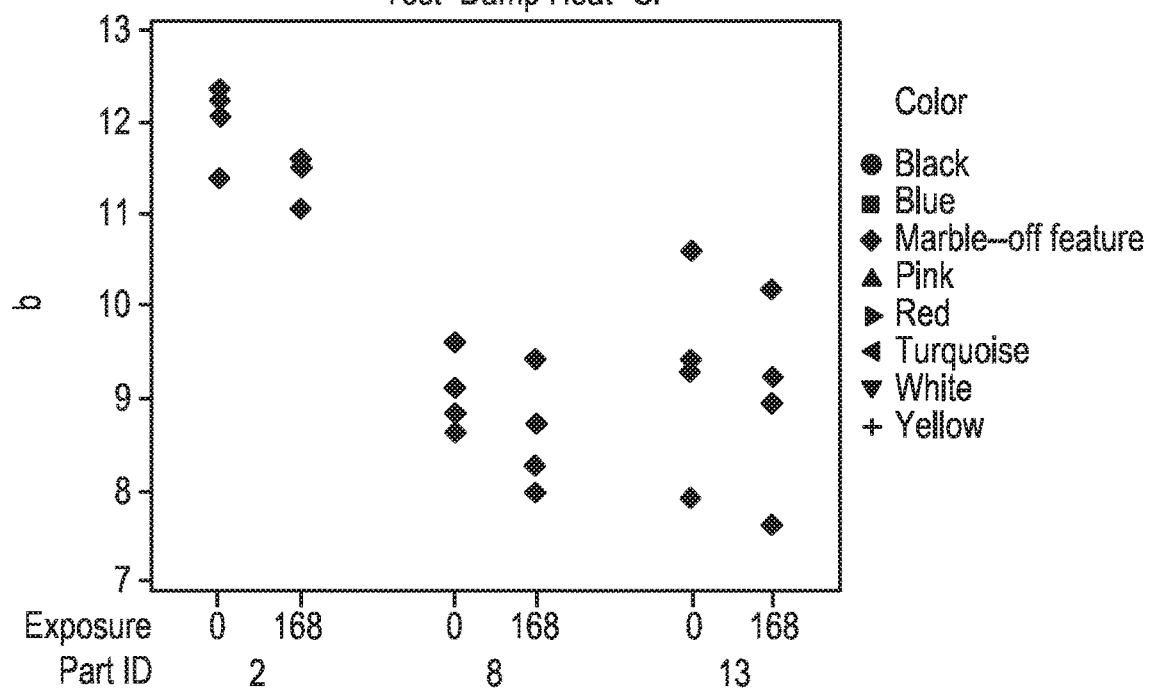

FIGS. 5A-5N are plots of exemplary embodiments measured for color shift with a spectrometer after certain tests. With reference to FIGS. 5A-5N, measurements of individual colors (e.g., cyan/blue, magenta/red, yellow, black, light cyan/turquoise, light magenta/pink, white) and a light marble design for color fade/shift were conducted in three different environmental testing experiments (e.g., damp heat, high temperature and thermal cycling testing). During these experiments, all colors were inkjet printed followed by a screen print. The light marble design was printed as a semi-transparent inkjet followed by a screen print. Each measurement illustrated in FIGS. 5A-5N were taken using common LAB color reading on a spectrophotometer where L represents the lightness, or position between black (0) and white (100), A represents color position between green (value −) and magenta (value +), and B represents color position between blue (value −) and yellow (value +). As illustrated in FIG. 5A, confidence intervals of mean for lightness (L) of three marble samples are shown at a time of 0 and 168 hours of damp heat exposure. FIG. 5B provides an illustration of confidence intervals of mean for lightness (L) of four multiple color samples at a time of 0 and 168 hours for high temperature exposure. FIG. 5C provides an illustration of confidence intervals of mean for lightness (L) of three multiple color samples at a time of 0 and 19 hours for thermal cycling exposure. FIG. 5D provides an illustration of confidence intervals of mean for position between magenta/green (A) of four multiple color samples at a time of 0 and 168 hours for high temperature exposure. FIG. 5E provides an illustration of confidence intervals of mean for position between magenta/green (A) of three multiple color samples at a time of 0 and 19 hours for thermal cycling exposure. FIG. 5F provides an illustration of confidence intervals of mean for position between blue/yellow (B) of three marble samples at a time of 0 and 168 hours for damp heat exposure. FIG. 5G provides an illustration of confidence intervals of mean for position between blue/yellow (B) of four multiple color samples at a time of 0 and 168 hours for high temperature exposure. FIG. 5H provides an illustration of confidence intervals of mean for position between blue/yellow (B) of three multiple color samples at a time of 0 and 19 hours for thermal cycling exposure. FIG. 5I provides an illustration of individual values of lightness measurements (L) of three marble samples at a time of 0 and 168 hours for damp heat exposure. FIG. 5J provides an illustration of individual values of measurements for position between magenta/green (A) of four multiple color samples at a time of 0 and 168 hours for high temperature exposure. FIG. 5K provides an illustration of individual values of measurements for position between magenta/green (A) of three multiple color samples at a time of 0 and 19 hours for thermal cycling exposure. FIG. 5L provides an illustration of individual values of measurements for position between blue/yellow (B) of three marble samples at a time of 0 and 168 hours for damp heat exposure. FIG. 5M provides an illustration of individual values of measurements for position between blue/yellow (B) of four multiple color samples at a time of 0 and 168 hours for high temperature exposure. FIG. 5N provides an illustration of individual values of measurements for position between blue/yellow (B) of three multiple color samples at a time of 0 and 19 hours for thermal cycling exposure. As shown in each of these figures, embodiments of the present disclosure provide superior adhesion and encapsulated image performance.

Figure 6:
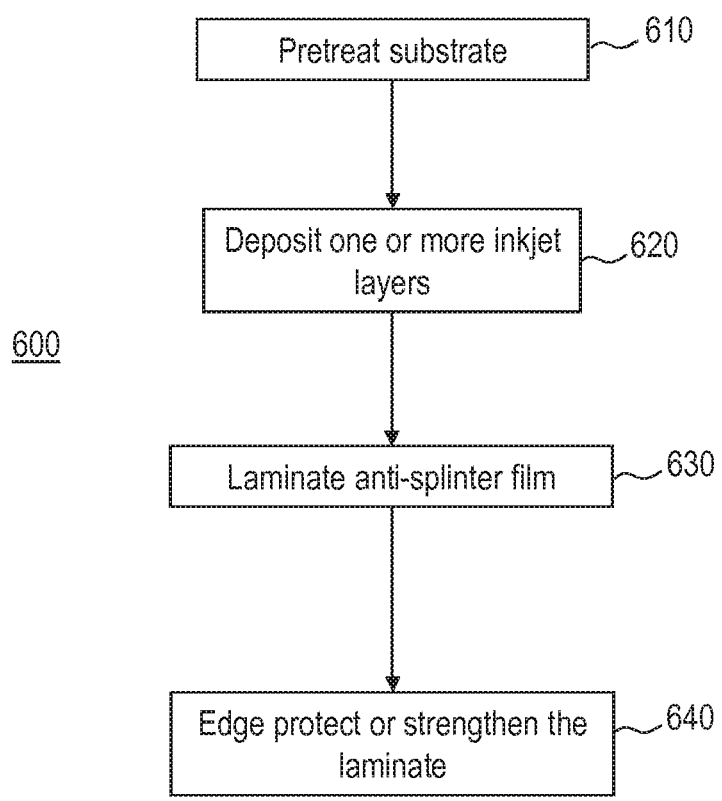
FIG. 6 is a diagram of another procedure for an embodiment of the present disclosure.

FIG. 6 is a diagram of another procedure for an embodiment of the present disclosure. With reference to FIG. 6, a procedure 600 is illustrated for providing a high quality printed image on a substrate. In step 610, an exemplary substrate such as, but not limited to, a glass substrate can be pre-treated with an adhesion promoter. Exemplary adhesion promoters include, but are not limited to, silanes, powder coatings, and other promoters each of which is described above with reference to FIGS. 1, 2 and 3. In an exemplary embodiment, an organic phosphate primer material can be utilized as an adhesion promoter. In such an embodiment, the organic phosphate or organophosphate primer material can be suspended in a solvent. An exemplary, non-limiting solvent can be an isopropanol solution. Exemplary organic phosphate primer materials include, but are not limited to, methacrylated phosphoric acids, monoalkyl phosphates, dialkyl phosphates, di-n-butylphosphate, and the like. Other examples of suitable phosphate materials include, but not limited to, vinyl phosphonic acid, vinyl phosphonic acid methyl ester, phosphates of hydroxy alkyl acrylates or methacrylates like the phosphate of 2-hydroxyethyl acrylate, or the phosphate of 2-hydroxyethyl methacrylate, 10-methacryloyloxydecyl dihydrogen phosphate, 10-acryloyloxydecyl dihydrogen phosphate, bis(2-acryloyloxyalkyl)acid phosphate, bis(2-methacryloyloxyalkyl)acid phosphate, and the phosphate of caprolactone modified hydroxyalkyl acrylate or methacrylate, N-(dimethylphosphonomethyl)acrylamide, phosphonic acid, P-[[(1-oxo-2-propen-1-yl)amino]methyl]-, vinyl-, bis(2-chloroethyl) phosphonic acid ester, tris(2-chloroisopropyl)phosphate, tris(2-chloroethyl)phosphate, tris(1,3-dichloroisopropyl)phosphate, other monomeric and oligomeric chloroalkyl phosphate esters, and phosphonic acids, and P-[[bis(2-hydroxyethyl)amino]methyl]-, and diethyl ester, to name a few. In one embodiment, the organic phosphate primer can be Primer Sunflower provided by Sun Innovations. The suspended primer or solution can be applied onto the substrate for a predetermined time (e.g., 10 min, 30 min, 1 hour, 2 hours, etc.), a soak, and then washed or wiped with a conventional solvent or water to remove excess material. In another embodiment, the glass substrate can be dipped into an exemplary solution rather than soaked for a predetermined time. After drying the substrate, an exemplary printing process can be employed to print an image on the substrate. Experimental testing has resulted in adhesion scores of greater than 4B or 5B for one or more weeks in an ASTM cross-hatch test. In some embodiments, the substrate can be planar or can be three dimensional (e.g., curved about one radius, two radii, convex, concave, etc.) to provide additional aesthetics and enhanced functionality. In step 620, one or more ink layers can be deposited or provided over the pretreated substrate. These ink layers can be deposited using conventional ink jet technology or other technology described above and can include any various artwork, customized or otherwise. In some embodiments, the layer(s) can be opaque or can be semi-transparent. In one non-limiting example, a white ink layer can be applied after one or more color layers to "pop" the color, similar to what a white paper would provide to the ink image in conventional printing. In another embodiment, a white ink layer can be followed by a black ink layer to assist in stopping any object or features from showing through the printed image. In a further embodiment where only a white ink layer is deposited (i.e., no black ink layer), backlighting features can be enabled. In certain embodiments where the white ink contains TiO2 particles, an exemplary printer can include an agitation mechanism to prevent separation in the white ink pigment.

In step 630, an anti-splinter film can be laminated to the stack. As images, products or pictures can experience impact events throughout its life, an anti-splinter film can be used to ensure shard retention during such breakage events. An exemplary anti-splinter film can also be utilized to provide a white, frosted, opaque, colored, etc. backing to embodiments of the present disclosure. For example, a film can be laminated to the printed glass using a pressure-sensitive-adhesive (PSA) and a roller laminator. A range of non-limiting polymer film materials can be used to achieve anti-splinter functionality, e.g., vinyl, polypropylene, high density polyethylene (HDPE), polyvinyl chloride (PVC), and the like. In some embodiments, clear or cloudy polyethylene terephthalate (PET), metallized polyester, lenticular plastic and/or polymer dispersed liquid crystals (PDLC) and like materials or modules can be used in various color schemes. In a preferred embodiment, vinyl films can be utilized in varying shades of white or other colors and with varying thicknesses to provide an exemplary product.

In step 640, the laminate can be edge protected and strengthened. For example, a sol gel, epoxy resin, or other polymeric coating can be deposited (spray coated, screen printed or coated, dip coated, etc.) on the laminate to improve drop strength or edge strength thereof. In one non-limiting embodiment, a UV curable coating can be utilized to improve drop strength when applied at the edge of a laminate. In one experiment, a decorated Corning Gorilla Glass laminate as described above was subjected to and passed 300 subsequent Tumble Drop Tests using an exemplary epoxy coating applied to the edges thereof. In some embodiments, step 640 can include curing the coating using a UV lamp, a heat lamp, etc.

In additional embodiments, the method 600 can take advantage of the flexibility provided by an ink jet printer and can include printing the image with a variety of border types (e.g., clear border, full bleed, colored border, feather-like border, etc.), can provide lettering on or around the image, can provide a textured or three-dimensional surface, including ADA compliant features (e.g., Braille), can include an anti-glare or anti-reflection coating on the substrate surface to control gloss level, can include a backlight apparatus or device (e.g., LED based thin lightbox, etc.).

Figure 7:
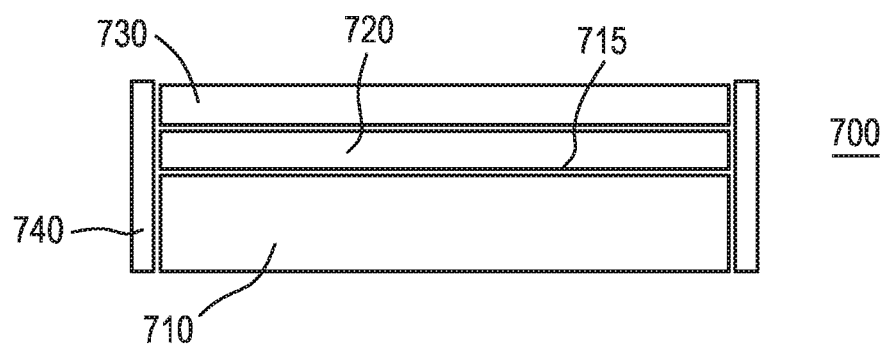
FIG. 7 is a simplified illustration of one embodiment of the present disclosure.

FIG. 7 is a simplified illustration of one embodiment of the present disclosure. With reference to FIG. 7, a laminate structure 700 is provided having a substrate 710 that can be pretreated with an organophosphate primer 715 suspended in a solvent, e.g., an isopropanol solution. Exemplary substrates include, but are not limited to, chemically strengthened glass, non-chemically strengthened glass, metal, canvas, wood, and acrylic substrates. In one embodiment, the substrate 710 can be a chemically strengthened glass substrate with a thickness ranging from 0.1 mm to 2.2 mm Exemplary organophosphate primers can be but are not limited to, a monoalkyl phosphate, dialkyl phosphate, and di-n-butylphosphate. The structure 700 further includes one or more layers of ink 720 deposited on the pretreated surface 715 of the substrate 710. A film 730 can be laminated on the one or more layers of ink 720 to form an imaged laminate 700. In some embodiments, the film 730 can be an anti-splinter film and can be white or colored. In other embodiments, the film 730 can be vinyl, polypropylene, high density polyethylene (HDPE), polyvinyl chloride (PVC), clear or cloudy polyethylene terephthalate (PET), metallized polyester, lenticular plastic and/or polymer dispersed liquid crystals (PDLC). In further embodiments, the laminate structure 700 can include a polymeric material 740 coating portions or all of the laminate 700 to strengthen the edges thereof. While the laminate 700 is illustrated as being planar in form, the claims appended herewith should not be so limited as the laminate 700 can be three-dimensional and have radii around one, two or more axes, can be concave, convex or another complex shape.

Figure 8:
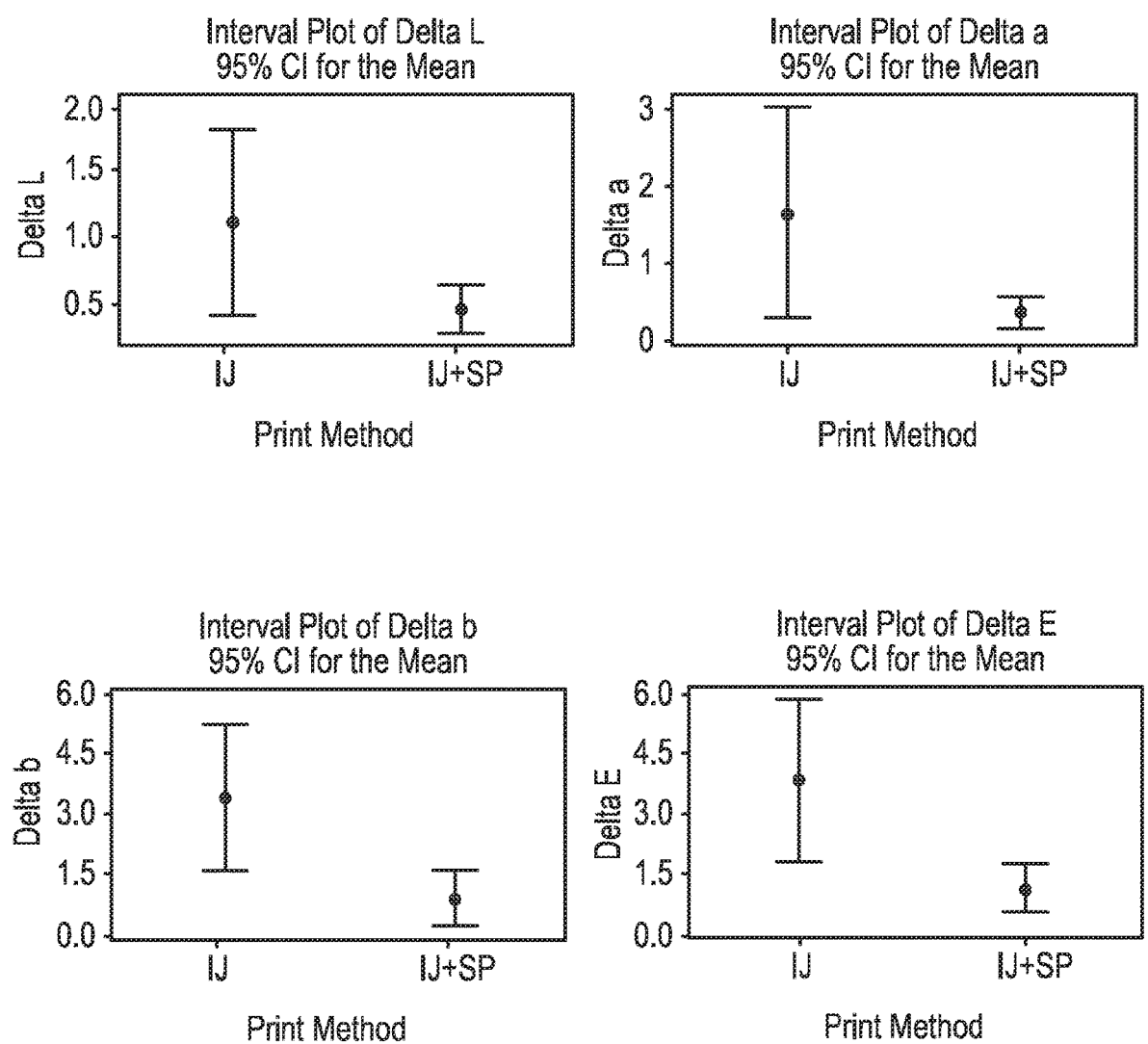
FIG. 8 is a series of interval plot of mean color shifts for some embodiments.

Some embodiments described herein can thus encapsulate ink printed by inkjet on Gorilla Glass utilizing a screenprint backer to improve durability of glass over time as screenprint inks are generically more robust than inkjet inks. To assess this, the decoration methods of inkjet on glass, inkjet on glass with a screenprint over the inkjet layer, and screenprint on glass were utilized. During the experiment, embodiments were characterized using a Barbieri Spectrophotometer in the CIE L*A*B color space. The embodiments were then exposed to different extreme conditions in environmental chambers for 21 days, e.g., high heat at 93° C., ambient humidity damp heat at 60° C., and 95-100% relative humidity thermal cycling from −20° C. to 80° C. and four hour soaks at these extremes. Color degradation was than evaluated by re-measuring the same embodiments using the same Barbieri system. In addition to ΔL, ΔA, and ΔB, ΔE was calculated which equates to the square root of the sum of the squares of ΔL, ΔA, and ΔB (see Table 1). As measured and illustrated in FIG. 8, mean color shift was more than 2× for all parameters associated with inkjet printing alone as compared with inkjet printing encapsulated by screenprint. These differences are statistically significant as indicated by the interval plots illustrated in FIG. 8 shown below for ΔB and ΔE.

TABLE 1

| Variable | Print Method | N | Mean | StDev |
| --- | --- | --- | --- | --- |
| Delta L | IJ | 14 | 1.101 | 1.186 |
|  | IJ + SP | 14 | 0.4599 | 0.3237 |
| Delta a | IJ | 14 | 1.669 | 2.351 |
|  | IJ + SP | 14 | 0.3746 | 0.3559 |
| Delta b | IJ | 14 | 3.464 | 3.197 |
|  | IJ + SP | 14 | 0.944 | 1.209 |
| Delta E | IJ | 14 | 4.21 | 3.91 |
|  | IJ + SP | 14 | 1.243 | 1.170 |

A second figure of merit for the adhesion of these embodiments was measured as a pummel test. Pummel tests are known tests generally conducted in the auto industry as a measure of glass adhesion to interlayers. After completion of the pummel testing, embodiments were rated on a scale of 1-10 (in increments of 0.5) based on the observed percentage of interlayer (film) material remaining. These pummel tests results are illustrated in FIG. 9 and Table 2 below.

TABLE 2

| Variable | Print Method | N | Mean | StDev |
| --- | --- | --- | --- | --- |
| Pummel | IJ | 3 | 0.000 | 0.000 |
| Pummel | IJ + SP | 4 | 5.000 | 1.225 |
| Pummel | SP | 7 | 8.857 | 2.393 |

Figure 9:
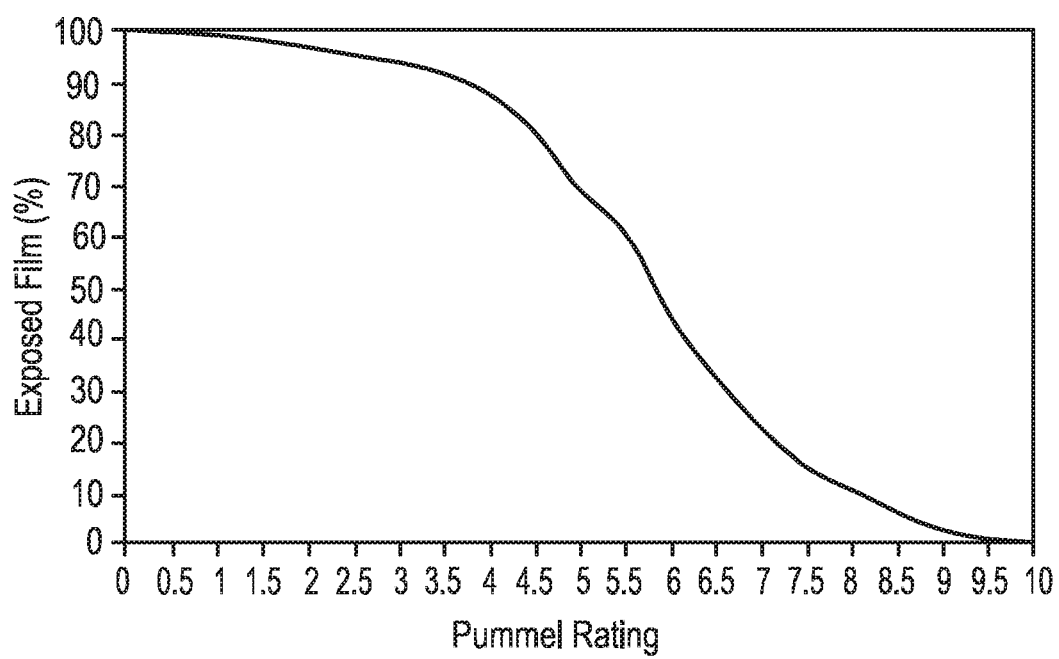
FIG. 9 is a plot of pummel rating for some embodiments.
Figure 10:
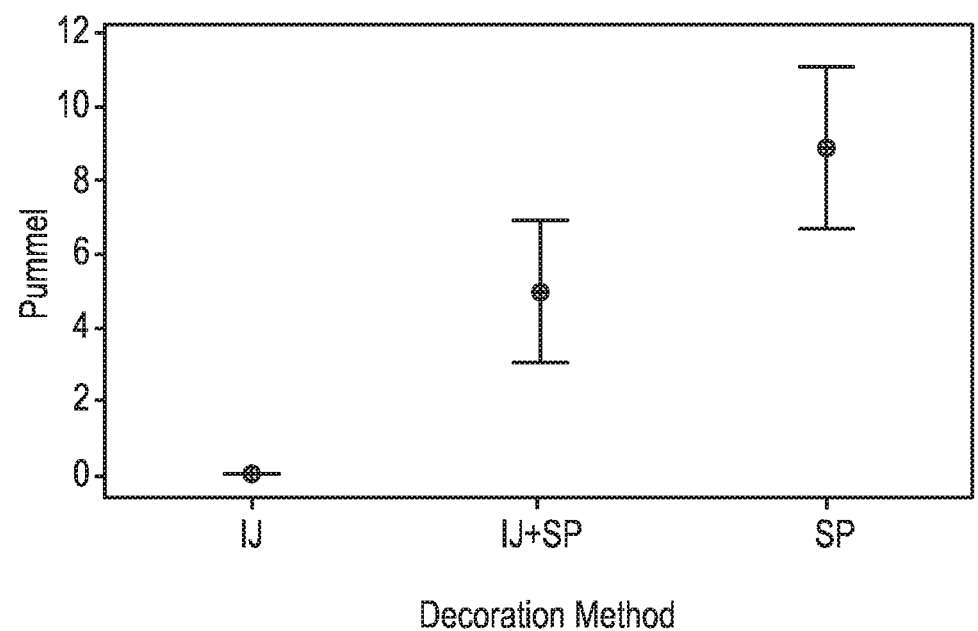
FIG. 10 is an interval plot of pummel values for some embodiments.
Figure 11:
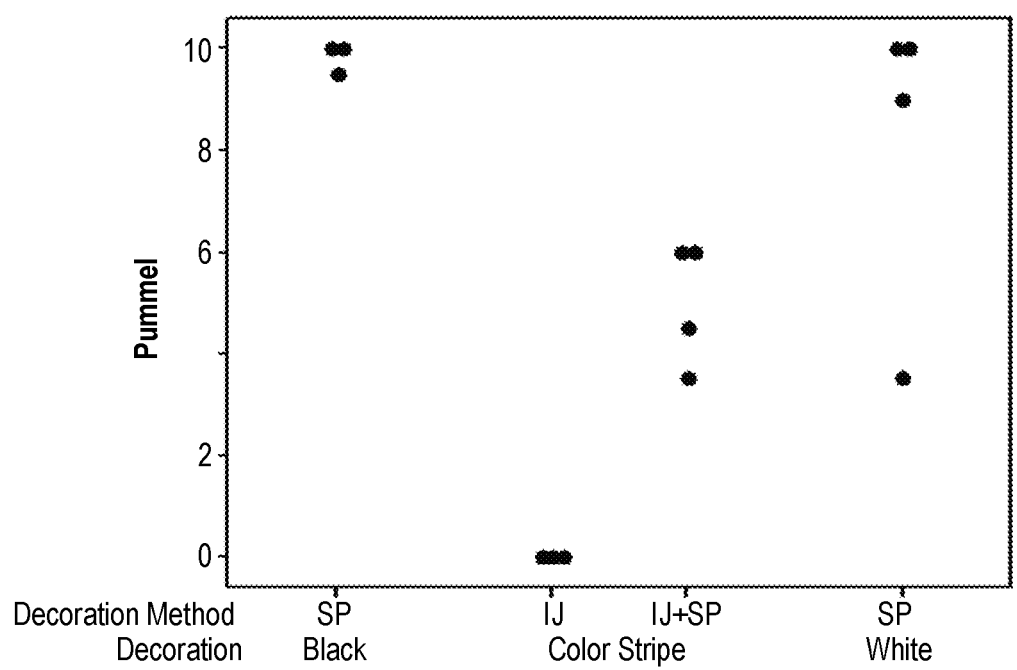
FIG. 11 is an individual value plot showing the individual measurements for some embodiments.

With reference to FIGS. 9-11 and Tables 1-2, screen-printed parts performed well but a notable difference can be observed between the inkjet and inkjet with screenprint backer. These differences are statistically significant as demonstrated by the 95% interval plot for the mean also shown in FIG. 10. FIG. 11 provides an individual value plot showing the individual measurements for each embodiment for ease of reference.

Embodiments described herein can thus combine attributes of different printing and decorating processes. For example, inkjet printing can be utilized for customized high-resolution images, followed by screen printing for its UV stability, durability, and increased white gamut. Such inkjet printing processes can be valued for their high resolution, wide color gamut, ease of customization, low setup time, photo-realistic images and low cost. Screen printing processes can be valued for their opacity, durability, solid colors, mass production, and UV stability. Through the combination of multiple technologies, materials and processes, an exemplary consumer product can be provided that is not only attractive in its appearance, but offers safety and user friendliness in a feature rich product that is cost effective and time-efficient.

In some aspects of the present disclosure, chemically strengthened glass (e.g., Gorilla Glass) can be used for its strength, scratch and break resistance as well as its thinness and superior optical clarity. In some embodiments, the thinness of the Gorilla Glass can remove parallax problems seen in conventional acrylics and thick soda lime glasses. The lightweight of Gorilla Glass can also enable easy mounting (e.g., using 3M command tape or Velcro tape). Exemplary organophosphate primers can be employed to provide superior adhesion with long shelf life after application. In some embodiments, the use of a white anti-splinter film can eliminate the need for printing white ink and can thus double printing speed and can increase color scheme flexibility, ambiance, contrast and programmability. Embodiments having an edge coating can also improve drop survivability.

In some embodiments, a method for printing ink on a glass substrate is provided. The method includes coating a glass substrate with a silane material, depositing a first layer of ink on the coated glass substrate, depositing a second layer of ink over the first layer of ink, and depositing a powder coating onto the second layer of ink. In another embodiment, the method includes curing the glass substrate having a deposited powder coating thereon. An exemplary silane material can be, but is not limited to, silanes having no functional groups, silanes having one or more functional groups, and combinations thereof. An exemplary powder coating includes material having inorganic particles, organic particles, thermally activated materials, components which absorb ultraviolet radiation, and combinations thereof. The first layer of ink can include a color image having a plurality of colors, and the second layer of ink can be solid white. In some embodiments, the glass substrate can have a thickness ranging from 0.1 mm to 2.2 mm. In other embodiments, the glass substrate can be chemically strengthened glass.

In other embodiments a method for printing ink on a glass substrate can include the steps of depositing a first powder coating on a glass substrate, depositing a first layer of ink on the coated glass substrate, depositing a second layer of ink over the first layer of ink, and depositing a second powder coating onto the second layer of ink. In another embodiment, the method includes curing the glass substrate having a deposited second powder coating thereon. The first and second powder coatings can include material such as, but not limited to, inorganic particles, organic particles, thermally activated materials, components which absorb ultraviolet radiation, and combinations thereof. Of course, the first and second powder coatings can be different. The first layer of ink can include a color image having a plurality of colors, and the second layer of ink can be solid white. In some embodiments, the glass substrate can have a thickness ranging from 0.1 mm to 2.2 mm. In other embodiments, the glass substrate can be chemically strengthened glass.

In further embodiments, a method for printing ink on a substrate can include the steps of coating a glass substrate with an adhesion promoter, depositing a first layer of ink on the coated substrate, depositing a second layer of ink over the first layer of ink, and depositing a powder coating onto the second layer of ink. In another embodiment, the method includes curing the glass substrate having a deposited powder coating thereon. Exemplary adhesion promoters can include a silane material or a powder coating. An exemplary powder coating material can include, but is not limited to, inorganic particles, organic particles, thermally activated materials, components which absorb ultraviolet radiation, and combinations thereof. The first layer of ink can include a color image having a plurality of colors, and the second layer of ink can be solid white. In some embodiments, the substrate can be a glass substrate and can have a thickness ranging from 0.1 mm to 2.2 mm. This glass substrate can be, in some embodiments, chemically strengthened glass.

In some embodiments a method for printing ink on a substrate is provided. The method can include pretreating a glass substrate, depositing one or more layers of ink on the pretreated glass substrate, overprinting the deposited one or more layers of ink with an overcoat, and curing the overprinted glass substrate to encapsulate the deposited one or more layers of ink. In some embodiments, the step of pretreating can further comprise one or both of cleaning the glass substrate of contaminants and coating the glass substrate with an adhesion promoter. An exemplary adhesion promoter can be a silane material, a powder coating, or an organophosphate material. In another embodiment, the step of depositing one or more layers of ink can further comprise depositing a layer of white ink. In yet a further embodiment, the step of depositing can further comprise inkjetting one or more layers of ink. An exemplary substrate can be a chemically strengthened glass substrate with a thickness ranging from 0.1 mm to 2.2 mm and/or can be planar or three dimensional in form. In another embodiment, the method can include depositing a powder coating on the overprinted substrate before curing the overprinted glass substrate. Exemplary powder coatings include material selected from the group consisting of inorganic particles, organic particles, thermally activated materials, components which absorb ultraviolet radiation, and combinations thereof.

In a further embodiment, a method for printing ink on a substrate is provided. The method includes pretreating a substrate with an organophosphate primer suspended in a solvent, depositing one or more layers of ink on a first surface of the pretreated substrate, and laminating a film onto to the first surface to form an imaged laminate. An exemplary film can be an anti-splinter film and can be white or colored. Additional films can include, but are not limited to, vinyl, polypropylene, high density polyethylene (HDPE), polyvinyl chloride (PVC), clear or cloudy polyethylene terephthalate (PET), metallized polyester, lenticular plastic and/or polymer dispersed liquid crystals (PDLC) films. In some embodiments, the method includes coating portions or all of the imaged laminate with a polymeric material. This coated portion(s) can then be cured. Exemplary, non-limiting substrates can be chemically strengthened glass, non-chemically strengthened glass, metal, canvas, wood, or acrylic substrates. In one embodiment, the substrate can be a chemically strengthened glass substrate with a thickness ranging from 0.1 mm to 2.2 mm. In another embodiment, the step of pretreating a substrate can further comprise soaking or dipping the substrate in the organophosphate primer, removing the primer, and drying the primed substrate.

While this description may include many specifics, these should not be construed as limitations on the scope thereof, but rather as descriptions of features that may be specific to particular embodiments. Certain features that have been heretofore described in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and may even be initially claimed as such, one or more features from a claimed combination may in some cases be excised from the combination, and the claimed combination may be directed to a subcombination or variation of a subcombination.

Similarly, while operations are depicted in the drawings or figures in a particular order, this should not be understood as requiring that such operations be performed in the particular order shown or in sequential order, or that all illustrated operations be performed, to achieve desirable results. In certain circumstances, multitasking and parallel processing may be advantageous Ranges can be expressed herein as from "about" one particular value, and/or to "about" another particular value. When such a range is expressed, examples include from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

It is also noted that recitations herein refer to a component of the present disclosure being "configured" or "adapted to" function in a particular way. In this respect, such a component is "configured" or "adapted to" embody a particular property, or function in a particular manner, where such recitations are structural recitations as opposed to recitations of intended use. More specifically, the references herein to the manner in which a component is "configured" or "adapted to" denotes an existing physical condition of the component and, as such, is to be taken as a definite recitation of the structural characteristics of the component.

As shown by the various configurations and embodiments illustrated in the figures, various methods for ink jet printing on glass substrates have been described.

While preferred embodiments of the present disclosure have been described, it is to be understood that the embodiments described are illustrative only and that the scope of the invention is to be defined solely by the appended claims when accorded a full range of equivalence, many variations and modifications naturally occurring to those of skill in the art from a perusal hereof.

We claim:

1. A laminate comprising:
    a glass substrate pretreated with an organophosphate primer suspended in a solvent, wherein the glass substrate is chemically-strengthened glass or non-chemically-strengthened glass;
    one or more layers of ink deposited on a first surface of the pretreated glass substrate; and
    a film laminated on the one or more layers to form an imaged laminate.

2. The laminate of claim 1, wherein the film comprises an anti-splinter film and is white or colored.

3. The laminate of claim 1, wherein the film is selected from the group consisting of vinyl, polypropylene, high density polyethylene (HDPE), polyvinyl chloride (PVC), clear or cloudy polyethylene terephthalate (PET), metallized polyester, lenticular plastic and polymer dispersed liquid crystals (PDLC).

4. The laminate of claim 1, further comprising a polymeric material coating portions or all of the imaged laminate.

5. The laminate of claim 1, wherein the organophosphate primer is selected from the group consisting of a methacrylated phosphoric acid, monoalkyl phosphate, dialkyl phosphate, di-n-butylphosphate, vinyl phosphonic acid, vinyl phosphonic acid methyl ester, phosphates of hydroxy alkyl acrylates or methacrylates, 10-methacryloyloxydecyl dihydrogen phosphate, 10-acryloyloxydecyl dihydrogen phosphate, bis(2-acryloyloxyalkyl)acid phosphate, bis(2-methacryloyloxyalkyl)acid phosphate, and the phosphate of caprolactone modified hydroxyalkyl acrylate or methacrylate, N-(dimethylphosphonomethyl)acrylamide, phosphonic acid, P-[[(1-oxo-2-propen-1-yl)amino]methyl]-, vinyl-, bis(2-chloroethyl) phosphonic acid ester, tris(2-chloroisopropyl)phosphate, tris(2-chloroethyl)phosphate, tris(1,3-dichloroisopropyl)phosphate, other monomeric and oligomeric chloroalkyl phosphate esters, and phosphonic acids, and P-[[bis(2-hydroxyethyl)amino]methyl]-, and diethyl ester.

6. The laminate of claim 1, wherein the glass substrate is three-dimensional.

7. The laminate of claim 1, wherein the solvent is an isopropanol solution.

8. The laminate of claim 1, wherein the glass substrate comprises any one of soda lime glass, an alkali containing aluminosilicate glass, an alkali containing aluminoborosilicate glass, an alkali containing borosilicate glass, or an alkali containing glass-ceramic.

* * * * *